(12) United States Patent
Hsiao et al.

(10) Patent No.: US 12,341,552 B2
(45) Date of Patent: Jun. 24, 2025

(54) ULTRA-WIDE BANDWIDTH ULTRA-ISOLATION DC-100 GIGAHERTZ FRONT-END MODULE WITH INTEGRATED DUPLEXER, LOW NOISE AMPLIFIER, AND POWER AMPLIFIER FOR WIRELESS COMMUNICATION APPLICATIONS

(71) Applicant: The Texas A&M University System, College Station, TX (US)

(72) Inventors: Meng-Jie Hsiao, Austin, TX (US); Cam V. Nguyen, Newport Beach, CA (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 279 days.

(21) Appl. No.: 17/787,958

(22) PCT Filed: Jan. 29, 2021

(86) PCT No.: PCT/US2021/015885
§ 371 (c)(1),
(2) Date: Jun. 22, 2022

(87) PCT Pub. No.: WO2021/155271
PCT Pub. Date: Aug. 5, 2021

(65) Prior Publication Data
US 2023/0036705 A1 Feb. 2, 2023

Related U.S. Application Data

(60) Provisional application No. 62/968,717, filed on Jan. 31, 2020.

(51) Int. Cl.
*H04L 5/14* (2006.01)
*H04B 1/12* (2006.01)
*H04B 1/525* (2015.01)

(52) U.S. Cl.
CPC ............. *H04B 1/525* (2013.01); *H04B 1/12* (2013.01); *H04L 5/14* (2013.01)

(58) Field of Classification Search
CPC ... H04B 1/12; H04B 1/18; H04B 1/38; H04B 1/525; H04L 5/0001; H04L 5/14;
(Continued)

(56) References Cited

U.S. PATENT DOCUMENTS 10,491,176 B1 * 11/2019 Hur .................. H03F 3/191
2002/0151291 A1 * 10/2002 Toncich ............. H04B 1/40
455/274

(Continued)

FOREIGN PATENT DOCUMENTS

| CN | 108183301 A | 6/2018 |
| JP | H1055498 A | 2/1998 |
| WO | 2020/198349 A1 | 10/2020 |

OTHER PUBLICATIONS

Meng-Jie Hsiao et al., Fully-Integrated Millimeter-Wave Duplexer Modules With Internal Power Amplifier and Low Noise Amplifier on 0.18-um BiCMOS Process for FDD 5G and Other Millimeter-Wave Applications, Disertation, Texas A&M Univeristy, 115 pages, Dec. 2019.*

(Continued)

*Primary Examiner* — Frank Duong
(74) *Attorney, Agent, or Firm* — CONLEY ROSE, P.C.

(57) ABSTRACT

Architectures of millimeter wave fully-integrated frequency-division duplex (FDD) transmitting-receiving (T/R) front-end (FE) modules include a duplexer (DUX), power amplifier (PA), and low noise amplifier (LNA) on a single semiconductor substrate to facilitate the development of system on a chip (SoC) for millimeter wave 5G wireless and next-generation communications applications. The entire balanced DUX module implements TX signals in differential mode, and RX signals in single-ended mode. LNA input (Continued)

is located at the center of a symmetrical plane of the entire FE module, resulting in an inherent ultra-high isolation between the differential PA output ports and the LNA input port across a ultra-wide bandwidth. The DUX can stand alone as a single unit in a system and is used together with external PA and LNA provided in the system, or it can include its own internal PA and LNA to form a DUX FE module.

22 Claims, 6 Drawing Sheets

(58) Field of Classification Search
CPC ......... H04L 5/1423; H04L 5/143; H04L 5/16; H04L 25/22
See application file for complete search history.

(56) References Cited

U.S. PATENT DOCUMENTS

| | | | | |
|---|---|---|---|---|
| 2004/0166804 | A1* | 8/2004 | Moloudi | H03H 11/1291 |
| | | | | 455/20 |
| 2004/0192230 | A1 | 9/2004 | Franca-Neto | |
| 2006/0019611 | A1 | 1/2006 | Mages | |
| 2006/0267734 | A1* | 11/2006 | Taki | G06K 7/0008 |
| | | | | 340/572.4 |
| 2009/0213770 | A1* | 8/2009 | Mu | H04B 1/123 |
| | | | | 370/281 |
| 2010/0225400 | A1 | 9/2010 | Rofougaran et al. | |
| 2014/0146718 | A1 | 5/2014 | Mikhemar et al. | |
| 2014/0306780 | A1 | 10/2014 | Lehtinen | |
| 2014/0312972 | A1* | 10/2014 | Yoneda | H03F 3/19 |
| | | | | 330/260 |
| 2015/0222412 | A1* | 8/2015 | Laughlin | H04W 72/0453 |
| | | | | 370/252 |
| 2017/0134067 | A1* | 5/2017 | Le-Ngoc | H04L 5/1461 |
| 2017/0195108 | A1 | 7/2017 | Liu | |
| 2017/0250200 | A1 | 8/2017 | Lee et al. | |

OTHER PUBLICATIONS

Laughlin et al., Electrical Balance Isolation for Flexible Duplexing in 5G Mobile Devices, IEEE, 6 pages, 2015.*
Onur Memioglu, An X-Band Electrical Balance Duplexer for in Band Full Duplex Communications, Disertation, Middle East Technical University, 98 pages, Jul. 2018.*
Ramzan, Flexible Wireless Receivers: On-Chip Testing Techniques and Design for Testability, Disertation, Linkoping University, 125 pages, 2009.*
PCT/US2021/015885 International Search Report and Written Opinion dated Apr. 16, 2021 (19 p.).
Elkholy, Mohamed Moustafa Mohamed Attia, "Circuits and Systems for On-Chip RF Chemical Sensors and EF FDD Duplexers," Dec. 2016 (https://oaktrust.library.tamu.edu/bitstream/handle/1969.1/158977/ELKHOLY-DISSERTATION-2016.pdf?sequence=1&isAllowed=y) (52 p.).

* cited by examiner

ULTRA-WIDE BANDWIDTH ULTRA-ISOLATION DC-100 GIGAHERTZ FRONT-END MODULE WITH INTEGRATED DUPLEXER, LOW NOISE AMPLIFIER, AND POWER AMPLIFIER FOR WIRELESS COMMUNICATION APPLICATIONS

CROSS-REFERENCE TO RELATED APPLICATIONS

This application is a 35 U.S.C. § 371 national stage application of PCT/US2021/015885 filed Jan. 29, 2021 and entitled "An Ultra-Wide Bandwith Ultra-Isolation DC-100 Gigahertz Front-End Module with Integrated Duplexer, Low Noise Amplifier, and Power Amplifier for Wireless Communication Applications," which claims the benefit of U.S. Provisional Application Ser. No. 62/968,717 filed on Jan. 31, 2020, and entitled "An Ultra-Wideband Ultra-Isolation Fully-Integrated FDD Transmit-Receive Duplexer Front-End Module with Integrated Duplexer, Low-Noise Amplifier and Power Amplifier for 5G and Next-Generation Wireless Communication Applications." Each of the aforementioned applications is hereby incorporated herein by reference in its entirety for all purposes.

STATEMENT REGARDING FEDERALLY SPONSORED RESEARCH OR DEVELOPMENT

Not Applicable.

BACKGROUND

In a 5th Generation (5G) wireless system operating at millimeter wave frequencies, for example, operating at 28 gigahertz (GHz), 37 GHz, and/or 39 GHz, signal transmission and reception preferably use a single antenna to maintain a relatively small system size and to support effective low-cost transmission and reception operations. Further, a frequency-division duplex (FDD) technique can transmit (TX) and receive (RX) signals simultaneously to enhance data throughput and fast operation, and hence is generally desirable for 5G applications. The duplexer separates transmission signals outputted by a power amplifier (PA) and transmitted by an antenna from reception signals that are received at the antenna and passed along to a low-noise amplifier (LNA). The duplexer also prevents TX signals from the PA from leaking to the LNA and desensitizing the reception signals that are received at the LNA.

In some approaches, duplexers have been designed using surface acoustic wave (SAW) or bulk acoustic wave (BAW) filters, ferrite circulators, active devices, or passive components. SAW or BAW filters could not integrate with semiconductor substrate and are hard to operate above 10 GHz; ferrite circulators are bulky and hard to integrate into integrated circuits, and reported passive components operate in a narrow bandwidth and occupy a relatively large chip area. Another passive approach uses an electrical balanced duplexer (EBD). However, most of EBD-based duplexers operate below 2.5 GHz and an external matching network is needed at a TX port of the EBD to interface with a PA, which adds complexity and size to the duplexer. Moreover, those EBDs degrade the transmitter to receiver (TX-RX) isolation at high frequencies, impeding them as viable candidates for millimeter wave 5G systems. Further, duplexers using active devices are inherently non-linear and require high power consumption in order to achieve sufficient linearity for large PA signals. Active devices with high power consumption also degrade the receiver noise performance.

BRIEF SUMMARY OF THE DISCLOSURE

In an embodiment, a first aspect relates to a front end (FE) device for a Fifth Generation (5G) and next-generation wireless communication applications. The FE device comprises a power amplifier, a duplexer, and an LNA. The duplexer, the PA, and the LNA are integrated onto a silicon substrate. The PA is configured to output differential TX signals. The duplexer includes a transformer and a power combiner. In an embodiment, the duplexer is configured to receive the differential TX signals, and simultaneously transmit one of the differential TX signals and receive a RX signal. The LNA is coupled to the duplexer and configured to receive the RX signal as a single-ended signal.

Optionally, in the preceding aspect, another implementation of the aspect provides that the DUX further comprises a plurality of DUX input ports, and antenna (ANT) port, and an ANT balance port. The plurality of DUX input ports is configured to receive the differential TX signals. The ANT port is coupled to the XFMR and the power combiner, where the ANT port is configured to receive a first output radio frequency (RF) signal for transmission to an air interface; and output a receive (RX) signal to the LNA for reception from the air interface. The ANT balance port is coupled to the XFMR and the power combiner and is configured to provide a balanced load for the DUX.

Optionally, in any of the preceding aspects, another implementation of the aspect provides that the XFMR is configured to receive the differential TX signals, generate the first output RF signal from a first differential TX signal of the differential TX signals, and generate the second output RF signal second from a second differential TX signal of the differential TX signals.

Optionally, in any of the preceding aspects, another implementation of the aspect provides that the power combiner is a Wilkinson power combiner that is configured to cancel the differential TX signals from the XFMR.

Optionally, in any of the preceding aspects, another implementation of the aspect provides that the power combiner is an inductor-capacitor (LC) lumped-element Wilkinson power combiner, and where the Wilkinson power combiner is configured to provide a low pass response to block unwanted signals and noise that is received from a TX and ANT side at an input to the Wilkinson power combiner.

Optionally, in any of the preceding aspects, another implementation of the aspect provides that the XFMR is a 1:N turns ratio XFMR or a N:1 turns ratio XFMR, and where a coil ratio of the 1:N turns ratio XFMR or the N:1 turns ratio XFMR is configured to be increased to lower insertion loss between the ANT port and the DUX input ports.

Optionally, in any of the preceding aspects, another implementation of the aspect provides that the XFMR is a 1:N turns ratio transformer or a N:1 turns ratio XFMR, where a coils ratio of the 1:N turns ratio XFMR or the N:1 turns ratio XFMR is configured to be a matching network for an output of the PA, and where the matching network is configured to transform an output impedance of the PA to an optimized impedance for maximizing PA output saturated power.

Optionally, in any of the preceding aspects, another implementation of the aspect provides that the DUX comprises a symmetric and balanced topology, where the symmetric topology is configured to cancel a portion of noise from the TX side and ANT side at an LNA input so as to lower a noise figure (NF) on a RX path.

Optionally, in any of the preceding aspects, another implementation of the aspect provides that the 1:N turns ratio XFMR or the N:1 turns ratio XFMR comprises primary windings and secondary windings, where a center tap of the primary windings or the secondary windings is configured to be coupled to ground to suppress the TX common-mode leakage.

Optionally, in any of the preceding aspects, another implementation of the aspect provides that the DUX comprises a plurality of DUX input ports configured to receive the differential TX signals, and a single-ended LNA input port configured to output an output receive (RX) signal.

Optionally, in any of the preceding aspects, another implementation of the aspect provides that an impedance of the single-ended input port is matched to an input impedance of the LNA.

Optionally, in any of the preceding aspects, another implementation of the aspect provides that an impedance of each of the DUX input ports is matched to an output impedance of the PA.

In an embodiment, a second aspect relates to a duplexer (DUX) for Fifth Generation (5G) and next-generation wireless communication applications, comprising a transformer (XFMR) and a Wilkinson power combiner coupled to the XFMR. The XFMR is configured to receive differential transmit (TX) signals from a power amplifier (PA) and simultaneously transmit a first differential TX signal of the differential TX signals and receive a receive (RX) signal. The Wilkinson power combiner is configured as a low-pass filter.

Optionally, in a preceding aspect, another implementation of the aspect provides that the Wilkinson power combiner is configured as an inductor-capacitor (LC) lumped-element Wilkinson power combiner, and where the Wilkinson power combiner is configured to suppress differential leakage signals that are received from a power amplifier.

Optionally, in any of the preceding aspects, another implementation of the aspect provides that the Wilkinson power combiner is configured to provide a low pass response to block unwanted signals and noise that are received at an input to the Wilkinson power combiner.

Optionally, in any of the preceding aspects, another implementation of the aspect provides that the XFMR comprises a 1:N turns ratio XFMR or a N:1 turns ratio XFMR, where N is an integer greater than or equal to 1, and where a coil ratio of the 1:N turns ratio XFMR or the N:1 turns ratio XFMR is configured to be increased to lower insertion loss on a TX path through the XFMR.

Optionally, in any of the preceding aspects, another implementation of the aspect provides that the 1:N turns ratio XFMR or the N:1 turns ratio XFMR comprises primary windings and secondary windings, where a coils ratio of the 1:N turns ratio XFMR or the N:1 turns ratio XFMR is configured to be a matching network for an output of a power amplifier (PA), and where the matching network is configured to transform an output impedance of the PA to an optimized impedance for maximizing PA output saturated power.

Optionally, in any of the preceding aspects, another implementation of the aspect provides that the DUX comprises a symmetric or balanced topology, wherein the symmetric topology is configured to cancel a portion of noise from the TX side and ANT side at an LNA input so as to lower a noise figure (NF) on a RX path.

Optionally, in any of the preceding aspects, another implementation of the aspect provides that the DUX comprises an antenna (ANT) port coupled to the Wilkinson power combiner and the transformer, an input receive (RX) port coupled to the Wilkinson power combiner, and differential output TX ports coupled to the transformer, where the differential output TX ports are configured to receive the differential TX signals.

Optionally, in any of the preceding aspects, another implementation of the aspect provides that each differential output TX port comprises an input impedance that is matched to a characteristic impedance of the PA.

Optionally, in any of the preceding aspects, another implementation of the aspect provides that the DUX comprises a second ANT port coupled to the Wilkinson power combiner and to the transformer, where the second ANT port comprises an ANT impedance that is matched to an impedance of the ANT port.

Optionally, in any of the preceding aspects, another implementation of the aspect provides that the XFMR is configured to output out-of-phase signals to each of the ANT port and the second ANT port.

Embodiments described herein comprise a combination of features and advantages intended to address various shortcomings associated with certain prior devices and systems. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the embodiments of the invention, reference will now be made to the accompanying drawings in which.

DETAILED DESCRIPTION OF THE EMBODIMENTS

Figure 1:
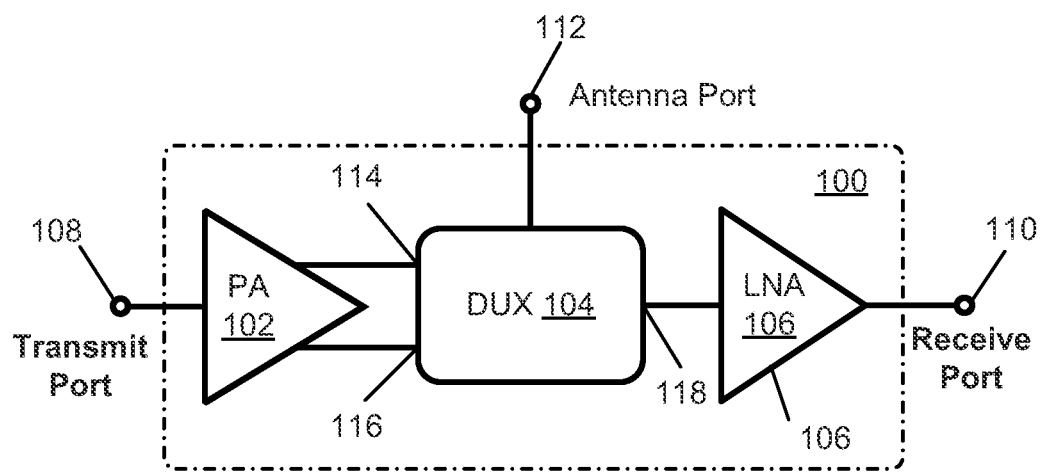
FIG. 1 is an illustrative schematic block diagram of a front-end (FE) device including an ultra-wide bandwidth duplexer module with an integrated PA and LNA in accordance with various embodiments.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the terms "couple", "coupled" or "couples" is intended to mean either an indirect or direct connection. Thus, if a first device couples to a second device, that connection may be through a direct connection of the two devices, or through an indirect connection that is established via other devices, components, nodes, and/or connections.

5G wireless systems may operate at millimeter wave frequencies between 24 GHz-86 GHz. Using time division duplexing (TDD) or frequency division duplexing (FDD) techniques, 5G systems may use a power amplifier (PA) to transmit (TX) signals from an antenna (ANT) and use a low-noise amplifier (LNA) to receive signals from the ANT. Therefore, the PA and LNA may share a single antenna during transmission and reception. While an ANT transmits at different time periods in TDD, FDD allows the antenna to transmit and receive signals at the same time or at a different time (with proper modification).

Frequency division duplex (FDD) techniques require the simultaneous operation of the PA and the LNA while sharing the same antenna. Two different but closely spaced frequency bands are employed for transmission and reception of signals at the antenna. Therefore, a duplexer may be needed at the antenna to separate TX signals and RX signals when implementing FDD. Due to the finite isolation of the duplexer, the strong transmission signals leak to the receiver input (for instance, an LNA) and desensitize the receiver. A high transmitter to receiver (TX-RX) isolation is required to limit desensitizing the receiver and keeping the receiver noise and linearity requirements feasible. A duplexer needs to have high isolation between the PA output/TX port and the LNA input/RX port; and low insertion loss between the TX, ANT, and RX ports. As used in the disclosure, the isolation between the TX and RX ports is a ratio of power in decibel (dB) which is propagated between the TX port and the RX port as a leakage signal. Providing higher isolation may prevent large signals at the TX port from desensitizing small signals received by the LNA. Insertion loss can be measured between an ANT port and a RX port (ILRX), or measured between a TX port and an ANT port (ILTX). ILRX is the loss in signal power, measured in dB, between the ANT port and the RX port. ILTX is the loss in signal power, measured in dB, between the TX port and the ANT port. A few conventional solutions implementing FDD techniques use surface acoustic wave (SAW) or bulk acoustic wave (BAW) filters, ferrite circulators, or active devices. However, these solutions are not effective in 5G wireless systems. (Jay Done)

In embodiments described herein, a 5G wireless system front-end (FE) device or circuit for FDD comprises a fully-integrated duplexer module that integrates a duplexer, a PA, and a LNA on a single 0.18-micrometer (μm) bipolar complementary metal-oxide semiconductor (BiCMOS) silicon substrate. It is noted that 0.18-μm BiCMOS silicon substrate may be used in embodiments; however, any appropriate microwave substrate or semiconductor substrate can be used for implementing the invention. In embodiments, the duplexer can stand alone as a single unit in a 5G wireless system, can be used with an external PA and LNA provided in the 5G wireless system, or can include an internal PA and LNA to form a duplexer module in the 5G wireless system. In an embodiment, the duplexer may include resistive and reactive components that provide impedance matching to integrated components in the FE circuit and to external ports. In other embodiments, the duplexer may provide impedance matching for external components. For instance, the duplexer may provide impedance matching to each of a differential TX port, an ANT port, and a RX port in the FE circuit. In embodiments, the impedance matching may facilitate integration with an integrated PA, ANT, and an LNA in the FE circuit, or may facilitate matching to external PA, ANT and an LNA.

In an embodiment, impedances at the TX port may be matched to a 50 ohm (Ω) load, and impedance at an ANT port may be matched using a Wilkinson power combiner to 50Ω. The RX port may be matched to an impedance of $R_{RX}$, which may be larger than 50Ω for optimum gain and noise matching to an LNA that can be electrically coupled to the RX port. In an embodiment, the FE circuit may be designed to provide a high isolation between a PA output and an LNA input. In an example, the FE circuit may provide at least 40 dB isolation between the PA output (i.e., at the DUX TX input ports) and an input to the LNA (i.e., LNA input port or DUX RX output port) input over an operating frequency range of 15 GHz to 100 GHz. At these operating frequencies, the FE circuit can be integrated with the PA and the LNA and may be designed to have certain gain, noise figure (NF), output power, and isolation, such as 20.8 dB gain with a 7.5 dB minimum noise figure (NF) for the entire RX path, and about 12 dB gain with better than 11 dBm maximum output power for the TX path, in a design example.

In another embodiment, a duplexer implemented for the direct current (DC) Hertz (Hz)-100 Gigaherts (GHz) ultra-wide bandwidth FDD duplexer module includes a inductor-capacitor (LC) lumped-element Wilkinson power combiner integrated with a grounded-center-tap transformer on a substrate. In an embodiment, the DUX may use 0.18 μm BiCMOS devices for 5G at 28 GHz, 37 GHz, 39 GHz, and higher frequencies. The DUX includes differential transmitter, one ANT ports, one replica ANT port, and a single-ended receiver port. The DUX includes impedance matching at the transmitter ports, at an ANT port, and at the RX port, high isolation between the TX port and RX port, and highly balanced differential transmitter waveforms received at the ANT ports. The DUX can be easily integrated with a single-ended low-noise amplifier (LNA), Analysis has been performed to confirm the DUXs characteristics and assess its performance.

Referring now to FIG. 1, an illustrative schematic block diagram of a front-end (FE) device 100 (hereinafter "FE device 100") for 5G wireless systems in accordance with various embodiments is shown. In an embodiment, FE device 100 includes circuits, components, and interconnects to transmit and receive radio frequency (RF) signals using FDD techniques in the millimeter wave range. In an example, FE device 100 may support multiple millimeter wave frequency bands, and the FE device 100 may be frequency tunable.

In an embodiment, FE device 100 includes a power amplifier (PA) 102, a duplexer (DUX) 104 and a low-noise amplifier (LNA) 106. In an embodiment, FE device 100 is a three-port device including three ports. For instance, FE device 100 includes a transmit (TX) port 108 (port 1), an antenna (ANT) port 112 (port 2), and a receive (RX) port 110 (port 3). TX port 108 is electrically coupled to a differential PA 102, RX port 110 is electrically coupled to LNA 106, and ANT port 112 is electrically coupled to DUX 104. In an embodiment, ANT port 112 may include an ANT port and a balanced ANT port (not shown). PA 102 may be a differential PA and can include one or more PA stages. LNA 106 may be a single-ended amplifier and can include one or more amplifier stages. DUX 104 may include one or more power combiners and transformers. In an embodiment, the DUX 104 may be implemented with a transformer and a Wilkinson power combiner. In an embodiment, the PA 102, the DUX 104, and the LNA 106 may be fully-integrated or implemented on a silicon (Si) substrate as an on-chip device and within its own electrical chip package. In examples, the semiconductor substrate may be implemented in the process of a standard silicon (Si) substrate, Silicon on insulator (SOI), Gallium-Arsenide (GaAs), Indium-Phosphide (InP) substrate, or the like.

FE device 100 offers the potential for benefits over conventional FE modules when operating in 5G systems and similar wireless systems. For instance, during operation, FE device 100 offers the potential for high isolation and lower insertion loss over conventional modules. In an example, the isolation between the input port of the DUX 104 (e.g., output of the PA 102) and output ports of the DUX 104 (e.g., input port of the LNA 106) can be higher than 45 dB in a frequency range of DC Hz-100 GHz. Also, during operation, FE device 100 has low insertion loss between ANT port 112 and input to the LNA 106 that is lower than 4 dB in a frequency range of DC Hz-100 GHz. Also, insertion loss from the input port of the DUX 104 to ANT port may be lower than 7 dB in the operating frequency range. Additionally, in an embodiment, the BiCMOS silicon substrate attenuates leakage of the TX signal through the silicon substrate using a PA with deep-n-well structures, p-type/n-type grounding guard rings, and deep trenches.

PA 102 may receive an input Alternating Current (AC) signal (e.g., an input radio frequency (RF) signal) that is injected at TX port 108. The PA 102 generates high-gain differential output AC (e.g., RF) signals (high-gain differential output signals) that are transmitted to DUX input ports 114, 116. The output AC signals at DUX input port 114 is 180 degrees out of phase with AC signals at DUX input port 116 but have the same amplitude. DUX 104 is coupled to PA 102 at DUX input ports 114, 116. DUX 104 receives the high-gain output AC signals from PA 102 and outputs a first TX signal to ANT port 112. Also, DUX 104 outputs a second TX signal to ANT balance port (not shown) which is dissipated into a load resistor. ANT balance port is configured to provide a balanced load (e.g., substantially similar load as that of the ANT port 112) for the DUX 104. In embodiments, the ANT balance port may be coupled to another ANT for receiving and transmitting TX and RX signals via the other ANT in a two-antenna configuration. An ANT can be coupled to ANT port 112 for radiating the TX signal from FE device 100 to an air interface as a transmission signal from FE device 100. The ANT may also receive an input reception signal (input RX signal) from the air interface, which is passed to DUX 104. DUX 104 is coupled to LNA 106 at the single-ended LNA input port 118. DUX 104 receives the input reception signal from ANT (not shown) via ANT port 112 and transmit an input RX signal at LNA input port 118. LNA 106 receives the input RX signal (e.g., input RF signal) at port 118 and generates a higher-gain LNA output signal (LNA RX signal) at RX output port 110.

As FE device 100 operates using an FDD technique, in an embodiment, PA 102 may transmit an output AC signal to an ANT port 112 concurrently while the LNA 106 is receiving the receiver signal from DUX 104 via the ANT port 112. Due to this concurrent operation of both PA 102 and LNA 106 in the duplexing operation, signal leakage of the output AC signal from PA 102 may cause desensitization of LNA 106. DUX 104 is designed as a symmetric duplexer where the Wilkinson power combiner and transformer impedances provide signals from the DUX input ports 114, 116 to the ANT port 112, and from the LNA input port 118 to the ANT port 112. Using this symmetry, differential leakage signals of the differential RF output signals combine to suppress the leakage signals from reaching the input to the LNA 106. As the amplitudes of the differential leakage signals are 180-degrees out of phase, the differential leakage signals cancel each other prior to reaching the input of the LNA 106 (e.g., at the LNA input port 118), which can desensitize the LNA 106. Using the symmetry of the DUX 104, the DUX 104 may provide TX-RX isolation between the PA 102 and LNA 106 to at least 40 dB over a frequency range of DC Hz-100 GHz).

Figure 2:
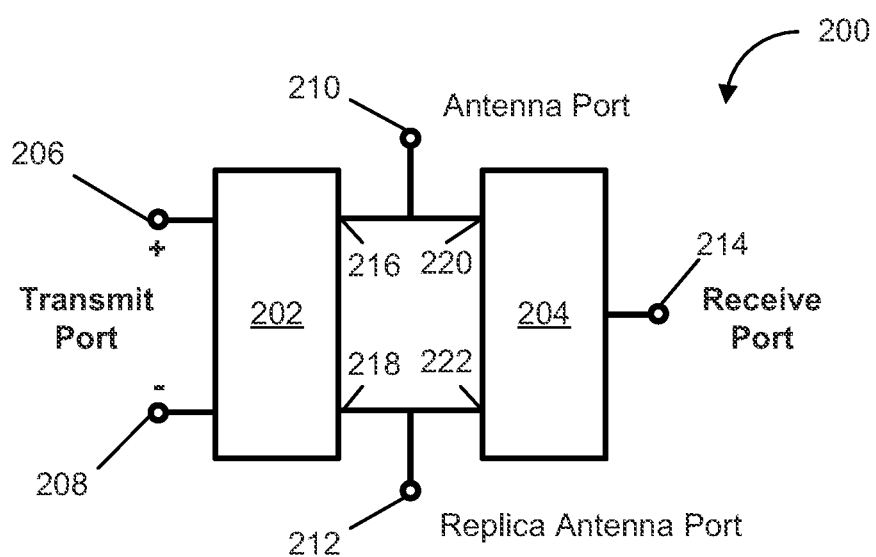
FIG. 2 is an illustrative schematic block diagram of an ultra-wide bandwidth duplexer module of FIG. 1 that is shown without the PA and the LNA in accordance with various embodiments.

FIG. 2 shows a block diagram of an integrated DUX 200 in accordance with various embodiments. In an example, DUX 200 may be the DUX 104 of FE device 100 (FIG. 1) that can be used for transmitting and receiving signals from an ANT port in 5G wireless systems in a frequency range of DC Hz-100 GHz. DUX 200 includes transformer 202, power combiner circuit 204, DUX input ports 206, 208 (e.g., differential input ports), LNA output port 214, antenna (ANT) port 210, and replica/balanced antenna (ANT) port 212. The DUX input ports 206, 208 receive input AC signals (e.g., differential RF signals) from a PA. The input AC signal at DUX input port 206 is phase-offset by 180 degrees from the input AC signal at DUX input port 208 but are equal in amplitude. In an example, input AC signals may be received from a differential PA 102 (FIG. 1).

Transformer 202 may be a 1:N or N:1 ratio transformer with a center-tap of the primary or secondary windings coupled to ground. N is an integer greater than or equal to 1. Transformer 202 provides impedance matching at the primary winding to achieve maximum power transfer to the secondary windings and suppresses undesired signal reflection. Transformer 202 may provide a band pass response to the differential RF output signals from a PA. Transformer 202 is coupled at its input to DUX input ports 206, 208, and at its output to output ports 216, 218. The transformer 202 includes a symmetrical topology between DUX input ports 206, 208 and ANT port 210 and replica ANT port 212. For example, similar impedance matching with passive components are implemented between each DUX input ports 206, 208 and respective ANT port 210 and replica ANT port 212. These impedances can provide a symmetrical topology to the transformer 202 between DUX input ports 206, 208 and ANT ports 210, 212. Output port 216 is electrically coupled to ANT port 210, while output port 218 is electrically coupled to replica ANT port 210. Replica ANT port 210 terminates into load resistance $R_L$ ohm (Ω) and provides a matching impedance of ANT port 210 in order to balance an antenna (not shown). ANT may be coupled to ANT port 210. An AC output signal from a PA that is received at ANT port 210 may be transmitted from an ANT (not shown), while an output signal from the PA that is received at replica ANT port 210 dissipates into load resistance $R_L$ that is coupled to a ground terminal.

Also shown in FIG. 2, power combiner circuit 204 may be an in-phase power combiner with three ports. Power combiner circuit 204 can be a Wilkinson power combiner circuit. The three ports include input ports 220, 222, and an LNA input port 214. Input ports 220, 222 are coupled to ANT port 210 and Replica ANT port 212, respectively. LNA input port 214 is configured to be coupled to an input of an LNA receiver, for example, LNA 106. In an embodiment, LNA receiver may be LNA 106 of FIG. 1. Also, LNA input port 214 may include impedances that are matched to a resistance $R_{RX}$. In an embodiment, the impedance $R_{RX}$ may be 50Ω. In operation, the power combiner circuit 204 receives an input RX signal (or input RF signal) at input port 220 from the ANT port 210. The input RX signal is split at port 220 and outputted as a first output RX signal to LNA RX port 214, while a second output RX signal is sent to input port 222. Ports 220, 222 are coupled together with resistors (e.g., $2R_{RX}$), which dissipates/attenuates the second output RX signal prior to the second output RX signal being received at input port 222. Ports 220, 222 are configured to receive a portion of the differential output signals VTX+ and VTX− signals as leakage signals $V_{Leak+}$ and $V_{Leak-}$. For instance, port 220 may receive leakage signal $V_{Leak+}$ and port 222 may receive AC leakage signal $V_{Leak-}$. $V_{Leak+}$ and $V_{Leak-}$ are AC signals that are about 180 degrees out-of-phase with respect to each other. The out-of-phase AC leakage signals $V_{Leak+}$ and $V_{Leak-}$ combine at the Wilkinson power combiner 204. When $V_{Leak+}$ and $V_{Leak-}$ are 180-degrees out of phase, their amplitudes at the Wilkinson power combiner cancel each other based on their differential voltages which enables DUX 200 to have an inherent high isolation performance thereby improving the isolation between DUX input ports 206, 208 and LNA input port 214.

Figure 3A:
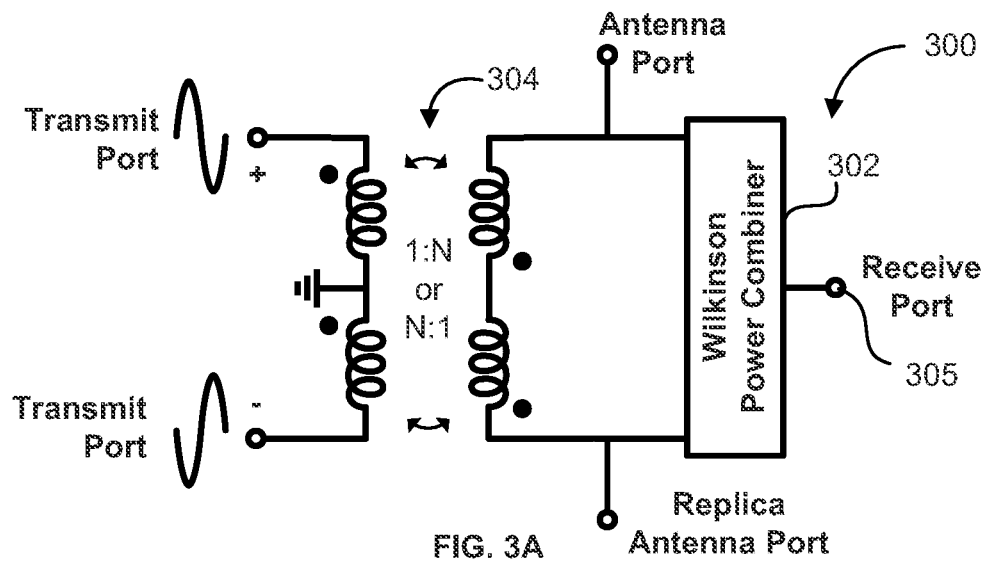
FIG. 3A is an illustrative schematic diagram of the ultra-wide bandwidth duplexer module of FIG. 1 showing its major components in accordance with various embodiments.
Figure 3B:
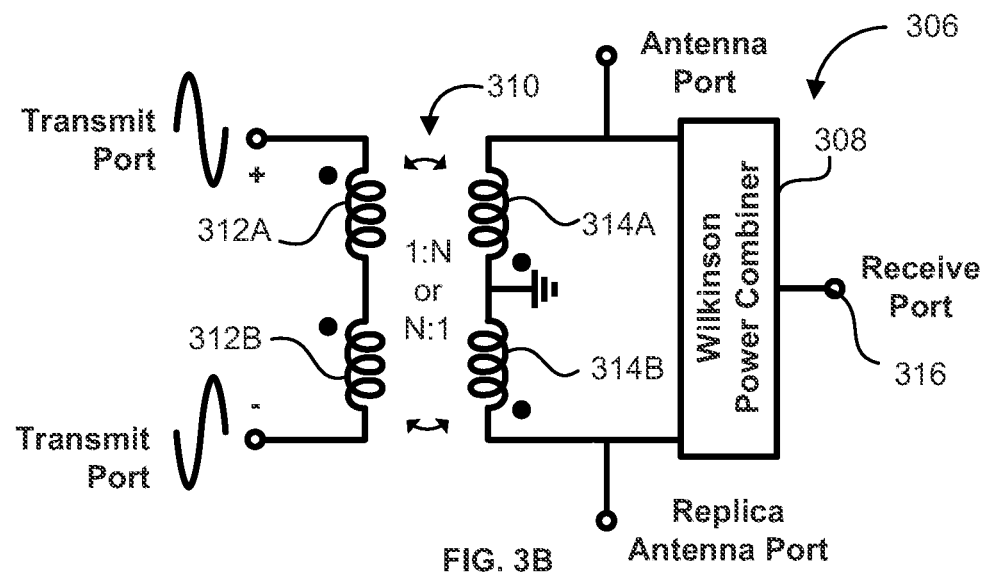
FIG. 3B is an illustrative schematic diagram of the ultra-wide bandwidth duplexer module of FIG. 1 showing its major components in accordance with various embodiments.
Figure 4:
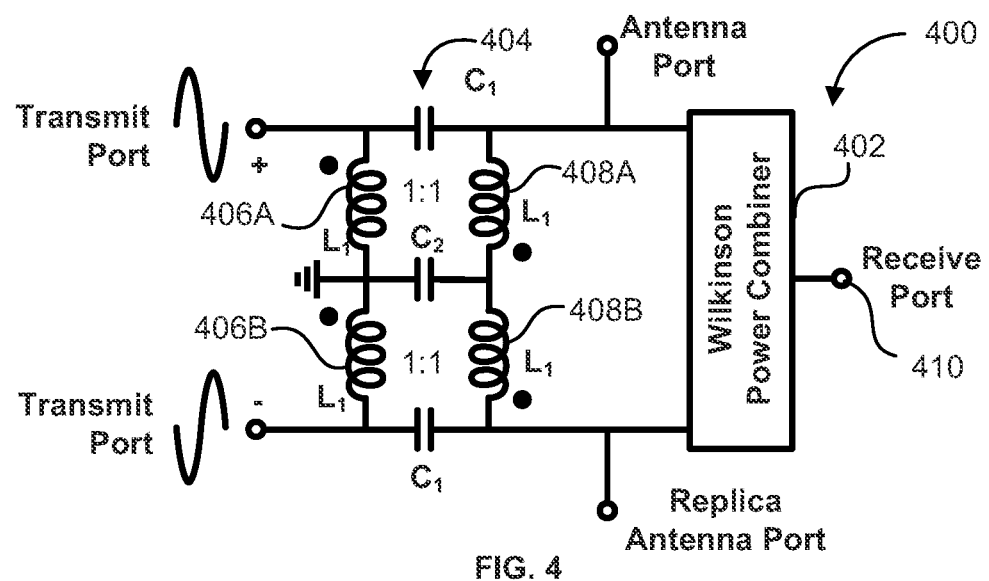
FIG. 4 is another illustrative schematic diagram of the ultra-wide bandwidth duplexer module showing its major components in accordance with various embodiments.

FIGS. 3A, 3B, and 4 show illustrative DUX module designs with a grounded center-tap transformer and an in-phase power combiner in accordance with various embodiments. The in-phase power combiner may be a Wilkinson power combiner as shown in FIG. 2. In embodiments, FIG. 3A illustrates a DUX module design 300 with Wilkinson power combiner 302 and grounded primary center-tap transformer with 1:N or N:1 turns ratio 304. FIG. 3B is an illustrative DUX module design 306 with Wilkinson power combiner 308 and a grounded secondary center-tap transformer with 1:N or N:1 turns ratio 310. Transformer 310 includes primary windings 312A, 312B, and secondary windings 314A, 314B. Center-tap of secondary windings 314A, 314B is grounded (connected to a ground terminal). The grounded center-tap of the transformer 310 significantly improves, the insertion loss on the TX path and suppress the TX common-mode leakage from a non-linear PA. In an embodiment, the insertion loss on the TX path is less than 10 dB from 50-125 GHz.

In an embodiment, FIG. 4 illustrates a DUX module design 400 with Wilkinson power combiner 402 and a grounded primary center-tap transformer with a 1:1 turns ratio 404. Transformer 404 includes primary windings 406A, 406B, and secondary windings 408A, 408B. Center-tap of primary windings 406A, 406B is grounded (connected to a ground terminal).

Figure 5:
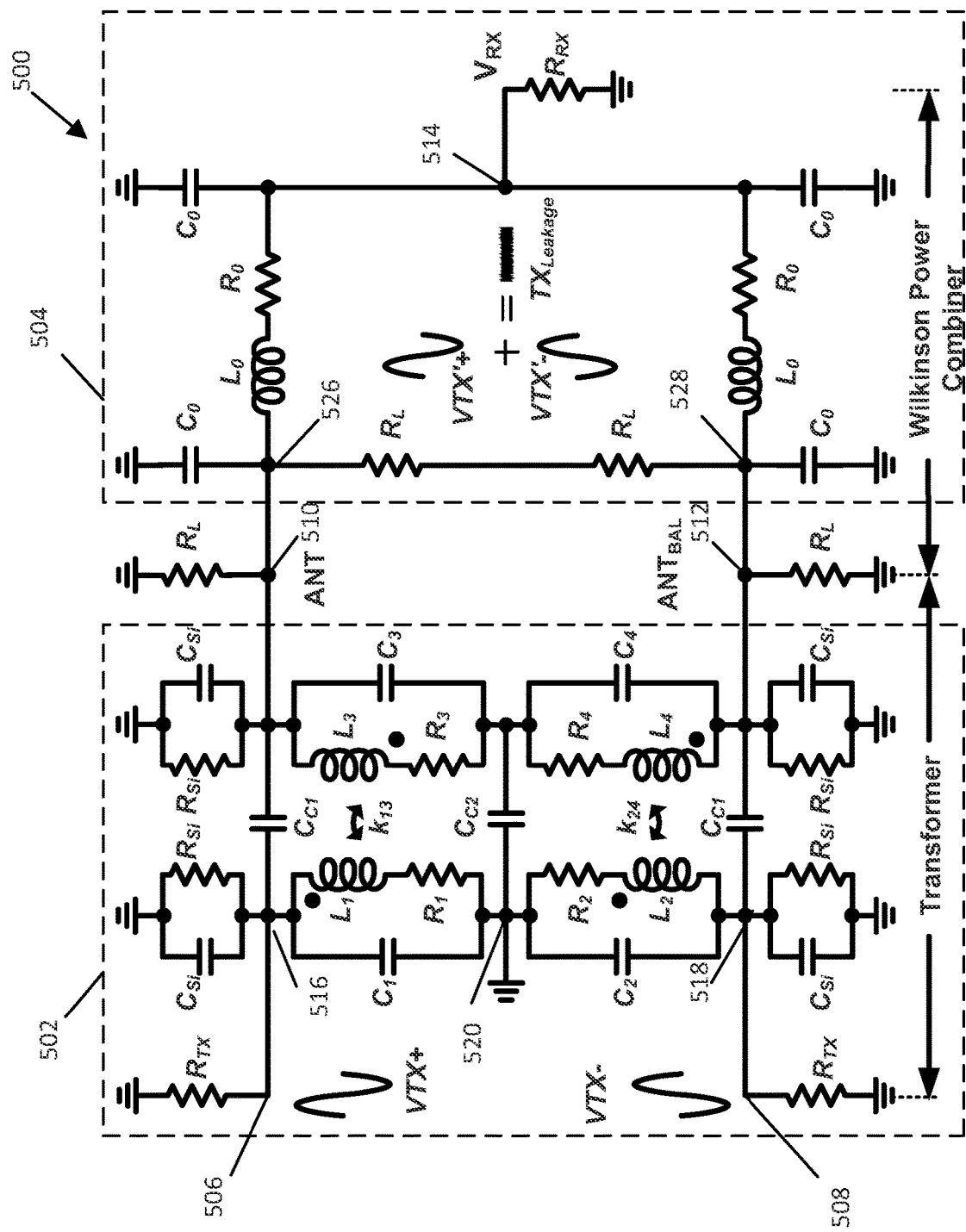
FIG. 5 is an illustrative schematic circuit model of an ultra-wide bandwidth duplexer design module in accordance with various embodiments.

FIG. 5 depicts an equivalent circuit model of DUX 500 with a grounded primary center-tap transformer with 1:1 ratio 502 and a Wilkinson power combiner 504. The DUX 500 demonstrates a design example of the DUX 200 of FIG. 2. The circuit model of DUX 500 demonstrates a design example of DUX 200 with 1:1 ratio grounded primary center-tap transformer 502 and power combiner 504. DUX 500 may include a symmetric topology between the DUX input ports and the LNA input port 514 (also referred to as an RX input port) that combines the out-of-phase AC leakage signals $V_{Leak+}$ and $V_{Leak-}$ from differential AC signals VTX and VTX− at inputs 526, 528 to the Wilkinson power combiner 504 and cancel each other thereby suppressing the AC leakage signals from reaching the input of an LNA connected to the LNA input port 514. Therefore, the e TX-RX isolation between the DUX input ports (e.g., differential TX output ports) 506, 508 and the LNA input port 514 is improved over conventional solutions. Further, the Wilkinson power combiner 504 improves the insertion loss (ILRX) between the ANT port 510 and the LNA input port 514 by preventing the leakage signals from desensitizing an LNA connected to the LNA input port 514. It is noted that, due to the symmetric structure of this FE module, a portion of the noise from TX side (for instance, the signal path from the PA 102 via the XFMR 502) and ANT side (for instance, the signal path from the antenna (not shown) via the Wilkinson power combiner 504 to the LNA input port 514) may be canceled out at LNA input port 514, leading to a lower noise figure (NF) on the entire RX path (for instance, from ANT to LNA input port 514).

In an embodiment, transformer 502 includes inductors $L_1$, $L_2$, $L_3$, and $L_4$, and capacitors $C_1$, $C_2$, $C_3$, and $C_4$. Inductor pairs $L_1$, $L_3$ and inductor pairs $L_2$, $L_4$ may be the mutual inductors of the primary coil and the secondary coil. During operation, DUX input ports 506, 508 (e.g., differential TX output ports) receive AC signals VTX+ and VTX− having the same magnitude. Further, the AC signals have a phase offset of 180-degrees with respect to each other.

DUX 500 improves isolation between the DUX input ports 506, 508 and LNA input port 514 using two primary and two secondary coils with a grounded primary center-tapped 1:1 turns-ratio transformer 502. The impedance imbalance ΔR between ANT port 510 and $ANT_{BAL}$ port 512 is to be kept as small as possible, which highlights the significance of a symmetric layout and ANT impedance balance. DUX 500 provides impedance matching to 50Ω at the DUX input ports 506, 508, ANT port 510 and $ANT_{BAL}$ port 512, and LNA input port 514. Impedance matching to 50Ω facilitates integrating the DUX with a differential PA at DUX input ports 506, 508, with an ANT at ANT port 510, and with an LNA at LNA input port 514. The impedance at the DUX input port 506 is a 50Ω input impedance. The impedance at The ANT port 510 may be matched to 50Ω using the Wilkinson power divider 502.

Figure 6:
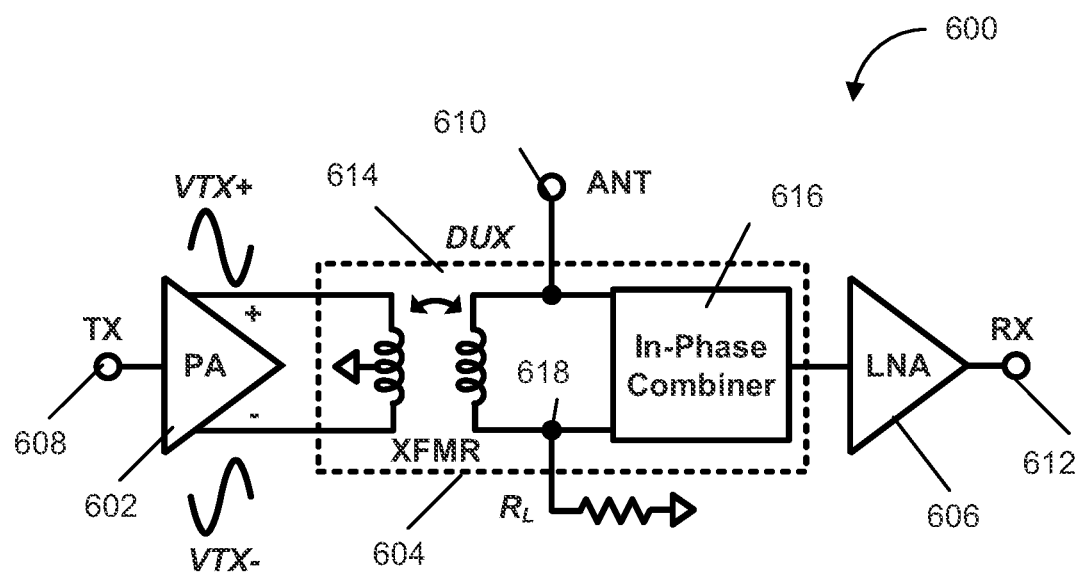
FIG. 6 is an illustrative schematic block diagram of ultra-wide bandwidth FE device that includes an internal PA, duplexer module and LNA in accordance with various embodiments.

A non-linear differential PA may also generate the common-mode TX signals that can leak to LNA input, leading to the degraded TX-RX isolation. The grounding of the primary center-tap could suppress the leakage of the common-mode TX signals and improve the TX-RX isolation between DUX input ports 506, 508 and LNA input port 514. The LC lumped-element Wilkinson power combiner with inductor L0, Resistor R0, and Capacitor C0 provides a low-pass frequency filtered response. The LC lumped-element Wilkinson power combiner functions as a low pass filter to suppress higher-frequency harmonics and leakage signals from the DUX input ports 506, 508 to the LNA input port 514 low pass response to filter out unwanted signals and noise at higher frequencies from TX and ANT side FIG. 6 shows an illustrative schematic block diagram of a fully-integrated front-end (FE) device 600 within an integrated PA, a DUX, and an LNA on a silicon (Si) substrate as an on-chip device and within its own electrical chip package in accordance with various embodiments. In an embodiment, the PA 102, the DUX 104, and the LNA 106 may be fully-integrated or implemented on a semiconductor substrate, such as Silicon (Si), Silicon-on-insulator (SOI), Gallium Arsenide (GaAs), Indium Phosphide (InP), and Gallium Nitride (GaN) substrate, as an on-chip device and within its own electrical chip package. In an embodiment, FE device 600 includes circuits, components, and interconnects that transmit and receive radio frequency (RF) signals using FDD techniques in the millimeter wave range. In an example, FE device 600 may support multiple millimeter wave frequency bands, and the FE device 100 may be frequency tunable.

In an embodiment, FE device 600 includes a power amplifier (PA) 602, a duplexer (DUX) 604 and a low-noise amplifier (LNA) 606. In an embodiment, PA 602 is a differential PA and can include one or more PA stages. PA 602 is configured to be controlled to transmit high-gain differential RF signals (RF output signals) from an input RF signal applied to TX input port 608. The differential RF signals are VTX+ and VTX− and are of equal amplitude voltage signals but are 180 degrees out of phase. PA 102 may receive the input RF signal at TX port 108 and generates the RF output signals that is transmitted to DUX 614.

In an embodiment, the DUX 610 may be implemented with a transformer 614 and an in-phase combiner 616. The transformer (XFMR) 614 receives the PA output signals VTX+ and VTX− at ports 610, 618. In an embodiment, XFMR 614 can function as a matching network at the output of the PA 602 by providing an impedance to the PA 602 from 50Ω to an optimized PA loading impedance for maximizing TX output power and TX saturated power from the PA 602. In other words, the PA 602 may not need an additional lossy output matching network, leading to higher gain on the TX path, larger TX saturated power, and better power efficiency for the entire FE module. Port 610 is an ANT port and port 618 is an ANT balance port. The RF signal VTX+ at port 610 is radiated out through an ANT (not shown) connected to port 610 while the RF signal VTX− at port 618 is dissipated into a resistor load $R_L$. Due to this concurrent operation of both PA 602 and LNA 606 in the duplexing operation, signal leakage of the RF output signals from PA 602 may leak to the in-phase combiner 616 and to the LNA 606. This signal leakage may cause desensitization of LNA 606. DUX 104 is a symmetric duplexer where the Wilkinson power combiner impedances that are symmetrical when matched to the ANT and the ANT balance. Using symmetrical impedances of the DUX 614, differential leakage signals from the PA 602 combine in the in-phase combiner 616 to cancel each other prior to reaching the LNA 106.

Figure 7:
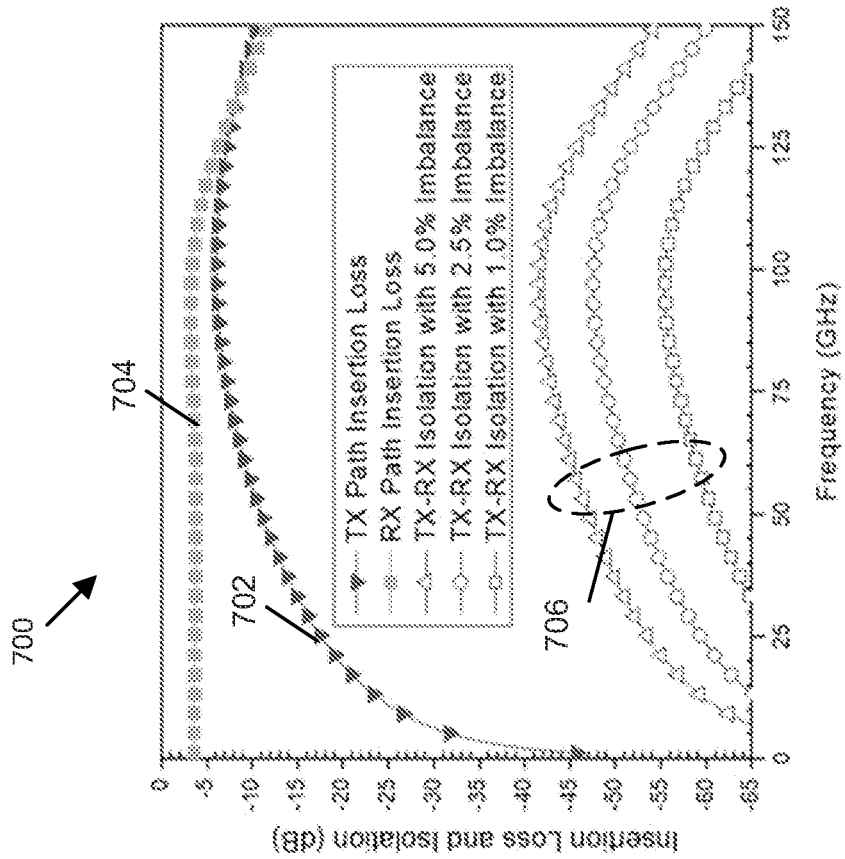
FIG. 7 is the simulated results of the insertion loss on the TX and RX path and the isolation between TX and RX port with imbalance loadings between two ANT port that illustrates functional operation of the duplexer device of FIG. 2 in accordance with various embodiments.

FIG. 7 is the simulated insertion loss on the TX and RX path and the isolation between TX and RX with imbalance ANT loadings 700 that illustrates functional operation of the duplexer circuit in accordance with various examples. The front-end circuit may be FE device 104 of FIG. 1. The waveform diagram includes simulated data for insertion loss from an output port of a PA to an ANT port (ILTX) 702 from DC Hz-150 GHz, insertion loss from an ANT port to an input to an LNA (ILRX) 704 from DC Hz-150 GHz, and RF isolation from output of a PA to an input to the LNA (ISO) 706 from DC Hz-150 GHz. As shown, the ILTX is less than 10 dB from 50-125 GHz. Further, as shown, ILRX is around −4 dB from DC Hz-100 GHz. Also, TX-RX Isolation is greater than −55 dB from DC Hz-50 GHz at 1.0 percent impedance imbalance, greater than −45 dB from DC Hz-50 GHz at 2.5 percent impedance imbalance and greater than −40 dB from 50 GHz-100 GHz at 5.0 percent impedance imbalance.

Figure 8:
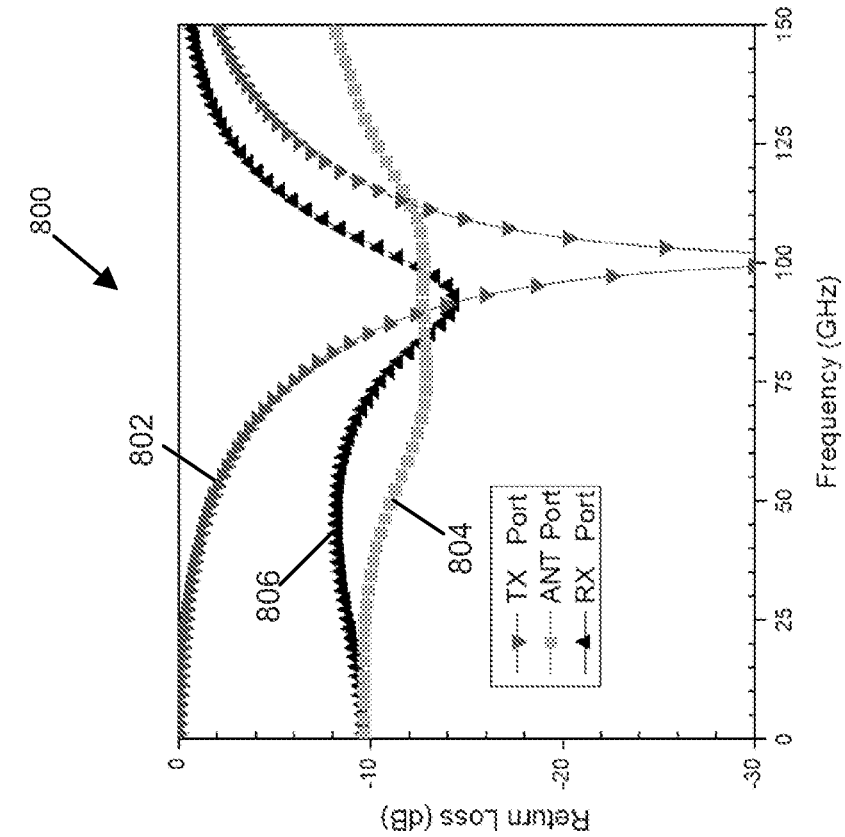
FIG. 8 is the simulated return loss of TX, ANT, and RX port that illustrates functional operation of the duplexer device of FIG. 2 in accordance with various embodiments.

FIG. 8 is the simulated return loss of TX, ANT, and RX port 800 that illustrates functional operation of a front-end circuit in accordance with various examples. The front-end circuit may be FE device 100 of FIG. 1. The waveform diagram includes simulated data for return loss of an output port of a PA ($RL_{TX}$) 802, return loss for an ANT port ($RL_{ANT}$) 804, and return loss for an input port of an LNA ($RL_{RX}$) 806. As shown, the $RL_{TX}$ and $RL_{RX}$ are greater than 10 dB at 100 GHz resonance. Further, as shown, $RL_{ANT}$ is greater than 8 dB from DC Hz-50 GHz and greater than 12 dB from 50 GHz-100 GHz.

Figure 9:
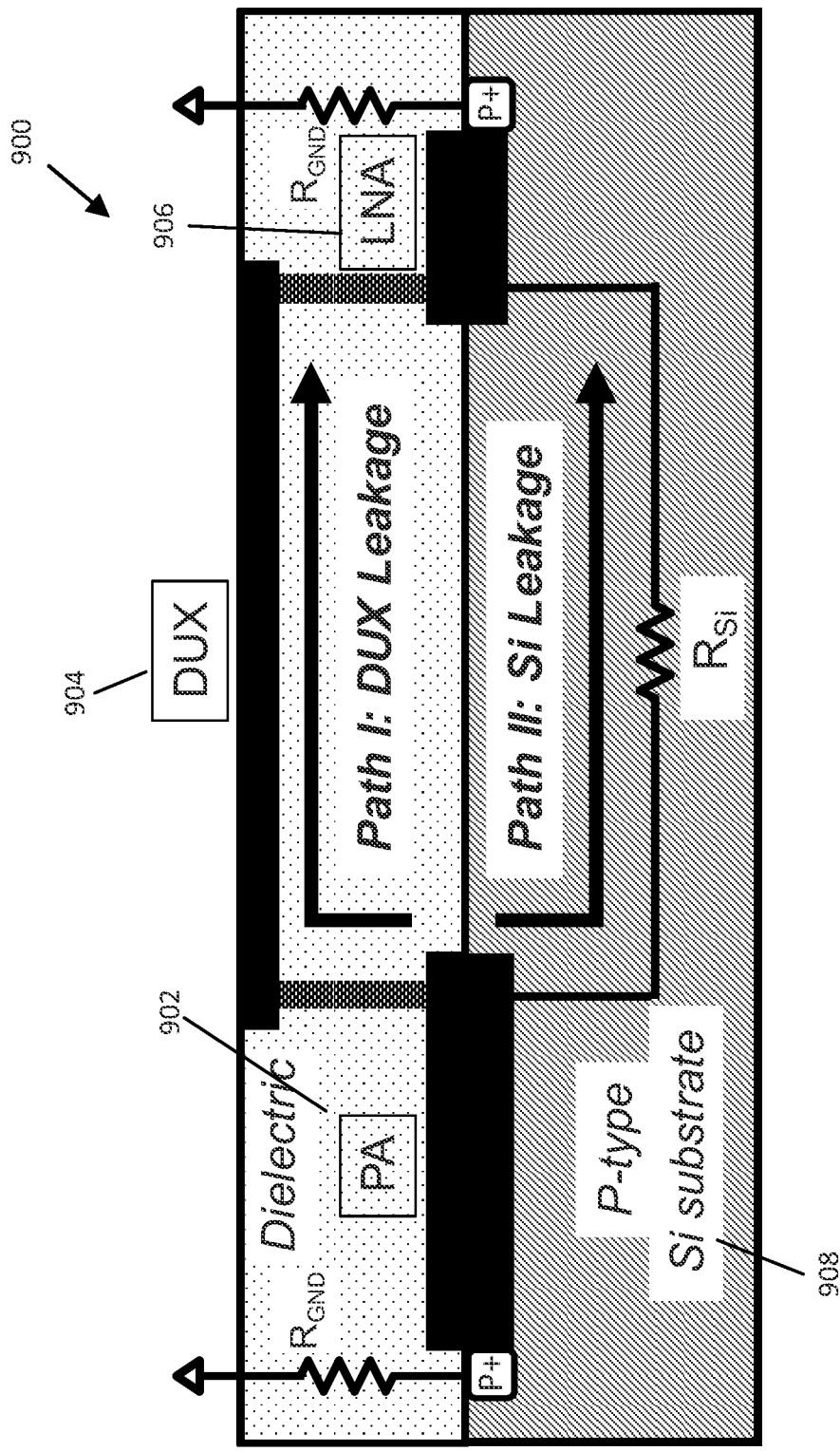
FIG. 9 is an illustrative cross-sectional view of a FE device in a semiconductor substrate that illustrates signal leakage paths in accordance with various embodiments.

FIG. 9 is a cross-sectional view of a FE device 900 in a semiconductor substrate that illustrates signal leakage paths in accordance with various embodiments. In embodiments, FE device 900 may be FE device 100 of FIG. 1 and includes a PA 902, DUX 904, and LNA 906. In FE device 900, signal leakage paths from PA 902 to LNA 906 may be via (1) DUX 904 (as DUX leakage) and (2) from a low-resistivity p-type silicon (Si) substrate 908 (as Si leakage). Si leakage is a common yet important issue in silicon-based RF integrated-circuit (RFIC) design, particularly for large RFICs and/or with TX and RX circuits integrated together. In order to achieve high isolation between TX and RX for a FE module, the Si Leakage path needs to be considered and suppressed.

The total TX leakage $V_{Leak}$ through FE device 800 from the PA to an LNA input may be expressed as $V_{Leak} \approx V_{TX}(ISO_{DUX}+ISO_{Si})$, where $ISO_{DUX}$ is the TX-RX isolation of the DUX itself and $ISO_{Si}$ is the leakage ratio through Si substrate. It is assumed that $ISO_{DUX}$ is about 45 dB. To achieve a total isolation better than 45 dB, $ISO_{Si}$ should at least be higher than 55 dB, making the leakage through the Si substrate important that needs to be minimized. $R_{GND}$ represents the resistance of the ground via from the p-type Si substrate to the topmost metal ground plane, typically around 0.1~0.5 Ohm. $R_{GND}$ can be reduced by including more solid contacts between the Si substrate and top-layer ground plane. Second, p- and n-type ground guard rings surrounding the PA 902 and LNA 906 are implemented. Also, deep trenches are implemented at the boundary between the PA output and LNA inputs to block the TX leakage through the Si substrate (Si leakage).

While the embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A front end (FE) device for Fifth Generation (5G) and next-generation wireless communication applications, comprising:
    a power amplifier (PA) configured to output differential transmit (TX) signals;
    a duplexer (DUX) comprising:
        a first transformer (XFMR) directly coupled to the PA and configured to:
            receive a first differential TX signal of the differential TX signals; and
            transmit a first radio frequency (RF) signal;
        a second XFMR directly coupled to the PA and configured to:
            receive a second differential TX signal of the differential TX signals; and
            transmit a second RF signal, wherein the first differential TX signal is offset in phase by 180 degrees with the second differential TX signal; and
        a power combiner coupled to the first XFMR and to the second XFMR, wherein the power combiner is configured to:
            receive a portion of the first RF signal and a portion of the second RF signal as differential leakage signals;
            combine the differential leakage signals to suppress the differential leakage signals; and
            receive a receive (RX) signal; and
    a low-noise amplifier (LNA) directly coupled to the duplexer and power combiner and configured to receive the RX signal as a single-ended signal, wherein the DUX, the PA, and the LNA are integrated onto a silicon substrate.

2. The FE device of claim 1, wherein the DUX further comprises:
    two DUX input ports coupled to the XFMR and configured to receive a respective one of the first differential TX signal and the second differential TX signal;
    an antenna (ANT) port coupled to the XFMR and the power combiner, wherein the ANT port is configured to:
        receive the first RF signal for transmission to an air interface; and
        output the RX signal to the LNA for reception from the air interface; and
    an ANT balance port coupled to the XFMR and the power combiner, wherein the ANT balance port is configured to provide a balanced load for the DUX and pass the second RF signal into a resistive load.

3. The FE device of claim 2, wherein the XFMR is configured to:
    generate the first RF signal from the first differential TX signal; and
    generate the second output RF signal from the second differential TX signal.

4. The FE device of claim 1, wherein the power combiner is a Wilkinson power combiner that is configured to cancel the differential leakage signals from being transmitted to an input of the LNA.

5. The FE device of claim 1, wherein the power combiner is an inductor-capacitor (LC) lumped-element Wilkinson power combiner, and wherein the Wilkinson power combiner is configured to provide a low pass response to block unwanted signals and noise that are received from a TX side and an ANT side at an input to the Wilkinson power combiner.

6. The FE device of claim 2, wherein the XFMR is a 1:N turns ratio XFMR or a N:1 turns ratio XFMR, and wherein a turns ratio of the 1:N turns ratio XFMR or the N:1 turns ratio XFMR is configured to be increased to lower insertion loss between the ANT port and the DUX input ports, wherein N is an integer greater than or equal to 1.

7. The FE device of claim 1, wherein the XFMR is a 1:N turns ratio transformer or a N:1 turns ratio XFMR, wherein N is an integer greater than or equal to 1, wherein a turns ratio of the 1:N turns ratio XFMR or the N:1 turns ratio XFMR is configured to be a matching network for an output of the PA, and wherein the matching network is configured to transform an output impedance of the PA to an optimized impedance for maximizing PA output saturated power.

8. The FE device of claim 5, wherein the DUX comprises a symmetric and balanced topology, wherein the symmetric and balanced topology is configured to cancel a portion of noise from the TX side and ANT side at an output of the DUX so as to lower a noise figure (NF) on a RX path.

9. The FE device of claim 6, wherein the 1:N turns ratio XFMR or the N:1 turns ratio XFMR comprises primary windings and secondary windings, wherein a center tap of the primary windings or the secondary windings is configured to be coupled to ground to suppress a TX common-mode leakage.

10. The FE device of claim 1, wherein the DUX comprises:
    a plurality of DUX input ports configured to receive the differential TX signals; and
    a DUX output port configured to output the RX signal to the LNA.

11. The FE device of claim 10, wherein the DUX output port comprises a first impedance, wherein the LNA comprises an LNA input port comprising a second input impedance, and wherein the first impedance is matched to the second input impedance.

12. The FE device of claim 10, wherein each of the DUX input ports comprise an impedance, wherein the PA comprises an output port comprising an output impedance, and wherein the impedance is matched to the output impedance.

13. A duplexer (DUX) for Fifth Generation (5G) and next-generation wireless communication applications, comprising:
    a first transformer (XFMR) configured to:
        couple to a power amplifier (PA);
        receive a first differential transmit (TX) signal from the PA; and
        transmit a first radio frequency (RF) signal;

a second XFMR configured to:
couple to the PA;
receive a second differential TX signal from the PA; and
transmit a second RF signal, wherein the first differential TX signal is offset in phase by 180 degrees with the second differential TX signal;
a Wilkinson power combiner coupled to the first XFMR and to the second XFMR, wherein the Wilkinson power combiner is configured to:
receive a portion of the first RF signal and a portion of the second RF signal as differential leakage signals;
combine the differential leakage signals to suppress the differential leakage signals; and
receive a receive (RX) signal, wherein the Wilkinson power combiner is configured as a low-pass filter.

14. The DUX of claim 13, wherein the Wilkinson power combiner is configured as an inductor-capacitor (LC) lumped-element Wilkinson power combiner, and wherein the Wilkinson power combiner is configured to suppress the differential leakage signals from the PA.

15. The DUX of claim 14, wherein the Wilkinson power combiner is configured to provide a low pass response to block unwanted signals and noise that are received at an input to the Wilkinson power combiner.

16. The DUX of claim 13, wherein the XFMR comprises a 1:N turns ratio XFMR or a N:1 turns ratio XFMR, wherein N is an integer greater than or equal to 1, and wherein a turns ratio of the 1:N turns ratio XFMR or the N:1 turns ratio XFMR is configured to be increased to lower insertion loss on a TX path through the XFMR.

17. The DUX of claim 16, wherein the 1:N turns ratio XFMR or the N:1 turns ratio XFMR comprises primary windings and secondary windings, wherein a turns ratio of the 1:N turns ratio XFMR or the N:1 turns ratio XFMR is configured to be a matching network for an output of the PA, and wherein the matching network is configured to transform an output impedance of the PA to an optimized impedance for maximizing PA output saturated power.

18. The DUX of claim 14, wherein the DUX comprises a symmetric and balanced topology that is configured to cancel a portion of noise from the TX side and from an ANT side at an output of the DUX so as to lower a noise figure (NF) on a RX path.

19. The DUX of claim 13, further comprising:
an antenna (ANT) port coupled to the Wilkinson power combiner and to the first transformer, wherein the ANT port is configured to receive the first RF signal;
an antenna balance (ANTBAL) port coupled to the Wilkinson power combiner and to the second XFMR, wherein the ANTBAL port is configured to receive the second RF signal;
an input receive (RX) port coupled to the Wilkinson power combiner;
a first differential output TX port coupled to the transformer and to the ANT port, wherein the first differential output TX port is configured to receive the first differential TX signal; and
a second differential output TX port coupled to the second XFMR and to the ANTBAL port, wherein the second differential TX port is configured to receive the second differential TX signal.

20. The DUX of claim 19, wherein each of the first differential TX port and the second differential TX port comprises an input impedance that is matched to a characteristic impedance of the PA.

21. The DUX of claim 19, wherein the ANT port comprises a first impedance, wherein the ANTBAL port comprises a second impedance that is matched to the first impedance of the ANT port.

22. The DUX of claim 21, wherein the first XFMR or the second XFMR is configured to output out-of-phase signals to each of the ANT port and the second ANT port.

* * * * *